United States Patent
Harvey

(10) Patent No.: US 7,561,028 B2
(45) Date of Patent: Jul. 14, 2009

(54) METHOD AND APPARATUS FOR PROVIDING A PERSONAL SECURITY SYSTEM

(75) Inventor: John Harvey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/402,582

(22) Filed: Mar. 27, 2003

(65) Prior Publication Data

US 2004/0190720 A1 Sep. 30, 2004

(51) Int. Cl.
*B60R 25/10* (2006.01)
(52) U.S. Cl. .................................. 340/426.1
(58) Field of Classification Search ........... 340/438, 340/539.16, 539.17, 426.11, 426.12, 430, 340/426
See application file for complete search history.

(56) References Cited

U.S. PATENT DOCUMENTS

| 5,557,254 | A | * | 9/1996 | Johnson et al. | 340/426.19 |
| 5,705,976 | A | * | 1/1998 | Howard | 340/426.34 |
| 5,739,748 | A | * | 4/1998 | Flick | 340/426.15 |
| 5,739,749 | A | * | 4/1998 | Hwang | 340/426.11 |
| 5,874,889 | A | * | 2/1999 | Higdon et al. | 340/426.36 |
| 5,940,004 | A | * | 8/1999 | Fulton | 340/825.49 |
| 5,969,596 | A | * | 10/1999 | Wu | 340/426.17 |
| 6,243,003 | B1 | * | 6/2001 | DeLine et al. | 340/425.5 |
| 6,471,277 | B1 | * | 10/2002 | Scensny et al. | 296/37.6 |
| 6,525,643 | B1 | * | 2/2003 | Okada et al. | 340/5.24 |
| 6,529,723 | B1 | * | 3/2003 | Bentley | 455/405 |
| 6,577,927 | B2 | * | 6/2003 | Shimazu | 701/1 |
| 6,664,899 | B1 | * | 12/2003 | Tsuchihashi | 340/825.69 |
| 6,771,167 | B1 | * | 8/2004 | Flick | 307/10.2 |
| 6,833,785 | B2 | * | 12/2004 | Brown et al. | 340/426.12 |
| 6,960,990 | B2 | * | 11/2005 | McKibbon | 340/426.35 |
| 2003/0060973 | A1 | * | 3/2003 | Mathews et al. | 701/209 |
| 2003/0151507 | A1 | * | 8/2003 | Andre et al. | 340/539.13 |
| 2004/0009772 | A1 | * | 1/2004 | Mazzara, Jr. | 455/436 |
| 2004/0054443 | A1 | * | 3/2004 | Hall et al. | 701/1 |
| 2004/0075541 | A1 | * | 4/2004 | Simoneau | 340/426.11 |
| 2004/0155783 | A1 | * | 8/2004 | Al-Sheikh | 340/584 |

OTHER PUBLICATIONS

International Search Report - PCT/U04/009307, International Search Authority - US, Dec. 1. 2004.
Written Opinion - PCT/US04/009307, International Search Authority - US, Dec. 1, 2004.
International Preliminary Report on Patentability, PCT/US04/009307, IPEA - US, Jul. 29, 2005.

* cited by examiner

*Primary Examiner*—Christian LaForgia
(74) *Attorney, Agent, or Firm*—Andrea L. Mays; Ashish L. Patel

(57) ABSTRACT

A personal security system (PSS) for use by an operator of a vehicle. The vehicle includes communication logic to communicate with a central station via a communication channel. The personal security system comprises timing logic that operates to measure a predetermined time period in response to receiving an actuation signal. The timing logic outputs a completion signal at the end of the predetermined time period. The personal security system also comprises message logic coupled to the timing logic that operates to generate a distress message in response to receiving the completion signal. The distress message is transmitted to the central station by the communication logic using the communication channel.

30 Claims, 8 Drawing Sheets

METHOD AND APPARATUS FOR PROVIDING A PERSONAL SECURITY SYSTEM

BACKGROUND

I. Field

The present invention relates generally to security systems, and more particularly, to a personal security system for use by an operator of a delivery vehicle.

II. Description of the Related Art

Advances in technology have provided for increased automation in many industries. For example, in the shipping industry, technology has allowed for the shipment and delivery of cargo virtually around the clock. Delivery vehicles now carry and deliver cargo to virtually all parts of the globe. In some cases, the deliveries are made at night and the delivery sites are unattended and in remote locations. For example, truck deliveries of hazardous materials including cyanide, petroleum, and propane are often made to unattended sites. During a delivery to one of these unattended sites, the driver must generally exit the vehicle to unload the truck's cargo, often using automated or semi-automated receiving equipment.

One problem associated with the delivery of cargo to remote and unattended locations involves the lack of personal security for the vehicle operator. For example, if something happens to the vehicle operator while delivering a load at an unattended site, it is possible that the situation would go unnoticed until customers start to report missed deliveries. For example, the operator may have an accident or illness that renders him or her unconscious or otherwise incapacitated and therefore unable to call for assistance. In an even more serious situation, while outside the safety of the vehicle, the operator may be attacked and injured by someone attempting to steal or damage the cargo. Thus, not only is the life of the operator at risk, but also so is the valuable and sometimes hazardous cargo, since it may be damaged, lost, or stolen as a result.

Therefore, what is needed is a personal security system that can be used by an operator of a delivery vehicle when making deliveries to remote or unattended locations. The system should also operate to protect the cargo from being lost or stolen if the operator is attacked or otherwise incapacitated.

SUMMARY

A personal security system is provided that operates to protect the operator of a delivery vehicle and/or the vehicle's cargo when making deliveries to remote and/or unattended locations. The vehicle operator can be either the driver of the vehicle, or a person other than the driver whose job responsibilities include exiting the safety of the vehicle to make a delivery or perform other vehicle services.

One embodiment provides a personal security system for use by an operator of a vehicle that includes communication logic to communicate with a central station over a communication channel. The personal security system comprises timing logic operable to measure a predetermined time period in response to receiving an actuation signal. The timing logic outputs a completion signal at the expiration of the predetermined time period. The personal security system also comprises message logic coupled to the timing logic and the communication logic. The message logic is operable to generate a distress message in response to the completion signal, wherein the distress message is transmitted to the central station by the communication logic using the communication channel.

In another embodiment, a method for providing a personal security system for use by an operator of a vehicle is provided. The vehicle includes communication logic to communicate with a central station over a communication channel. The method comprises steps of activating timing logic to measure a predetermined time period in response to an actuation signal, generating a completion signal after the timing logic measures the predetermined time period, generating a distress message in response to the completion signal, and transmitting the distress message to the central station via the communication channel using the communication logic.

In another embodiment, a personal security system is provided for use by an operator of a vehicle that includes communication logic to communicate with a central station over a communication channel. The personal security system comprises means for receiving an actuation signal and means for measuring a predetermined time period in response to the actuation signal. The system also comprises means for outputting a completion signal at the end of the predetermined time period, means for generating a distress message in response to the completion signal, and means for transmitting the distress message to the central station.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes methods and apparatus for providing a personal security system (PSS) for use in a delivery vehicle to protect the vehicle operator and/or the vehicle's cargo. The delivery vehicle includes communication logic that allows the PSS to communicate through a communication channel to a central station. In one embodiment, the PSS communicates through a satellite-based wireless communication channel to the central station. Although the embodiments described herein make reference to a wireless satellite-based communication system, it should be understood that any other wireless communication system, or wireless system in combination with wired voice or data networks, could be used in the alternative, including a terrestrial (ie, cellular) communication system, a microwave communication system, a PSTN telephone system, a data network such as the Internet, or any other type of wired or wireless communication system. It should also be understood that the described personal security system could also be used in conjunction with virtually any type of delivery vehicle including, but not limited to, trucks, buses, trains, aircraft, automobiles, and watercraft. Finally, an individual without a vehicle could use the described personal security system, such as in a situation where an individual enters a potentially dangerous environment to make a repair.

Figure 1:
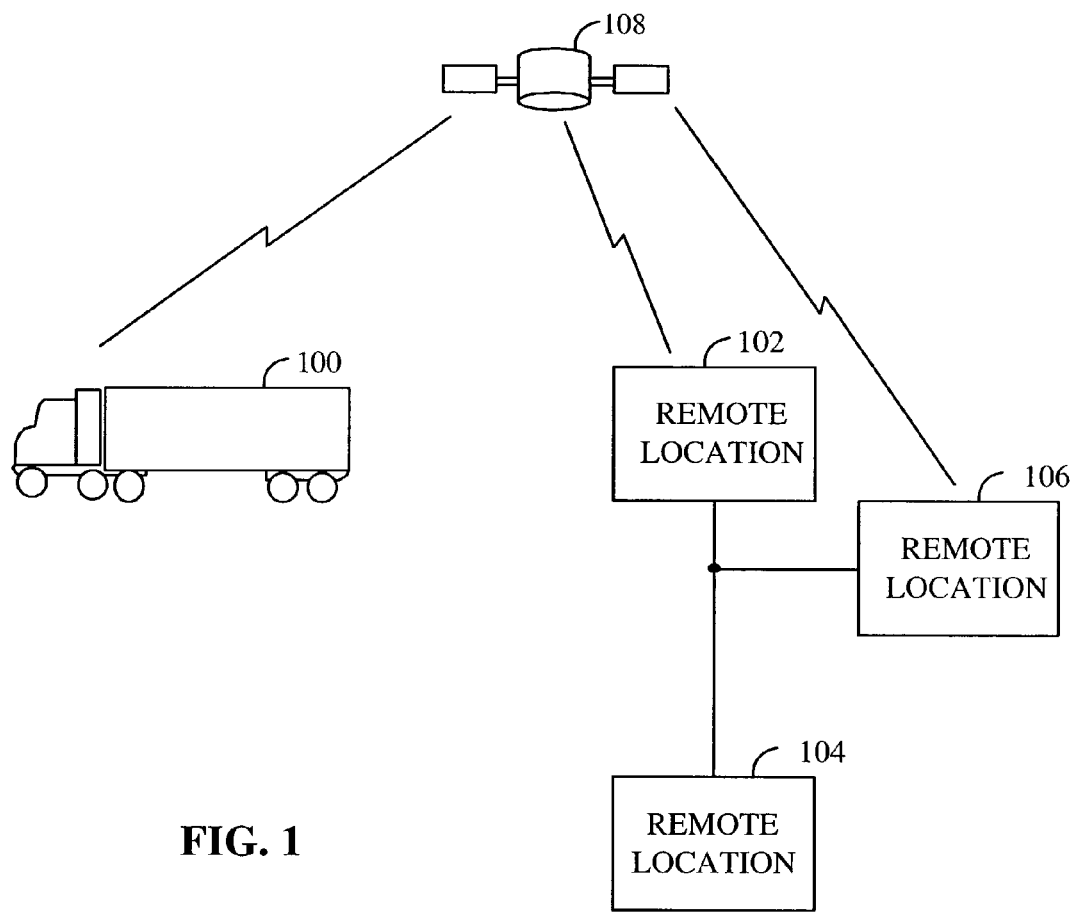
FIG. 1 illustrates a wireless communication system widely used in the trucking industry.

FIG. 1 illustrates a satellite-based wireless communication system widely used in the trucking industry for providing two-way communications between vehicle operators and third parties, such as a fleet management center or dispatch center, family members, governmental authorities, consignees, shippers, and so on. Vehicle 100 in this example comprises a tractor-trailer, commonly used in the long-haul trucking industry to transport goods from shippers to consignees. Vehicle 100 further comprises a mobile communication terminal (MCT, not shown) for communicating with a remote location 102 via satellite 108. Generally, the MCT resides onboard a tractor portion of the vehicle 100 so as to be easily accessible by the vehicle operator. In one embodiment, remote location 102 comprises a central processing center, otherwise known as a central station, hub, or network management center (NMC), and serves as a central communication point between MCT-equipped vehicles and their respective dispatch centers, other designated office(s), shippers, consignees, governmental authorities, family members, and so on. For example, in FIG. 1, remote location 102 passes communications between remote location 104 and vehicle 100. In this embodiment, remote location 104 comprises a vehicle dispatch center that generally monitors and controls a fleet of vehicles similar to vehicle 100.

Communications between remote location 104 and vehicle 100 may further be passed to one or more other remote locations, such as remote location 106. Remote location 106 comprises one of any number of interested third parties that are interested in communications between remote location 104 and vehicle 100. For example, remote location 106 could be another designated office of remote location 104, a shipper of goods being carried by vehicle 100, a consignee of goods being carried by vehicle 100, a governmental unit, a personal computer, and so on. Communications among remote locations 102, 104, and 106 may be carried out by any known communication techniques, including telephone, Internet, dedicated lines, wireless links, and so on.

The MCT located on vehicle 100 transmits and receives communications wirelessly using, in one embodiment, a satellite-based wireless communication system to communicate with remote location 102. Other wireless systems could be used in addition or in the alternative, such as an analog or a digital cellular telephone system, an RF communication system, or a wireless data communication network, such as a cellular digital packet data (CDPD) network. In other embodiments, the MCT may communicate directly with interested parties, such as remote locations 102, 104, and 106, without communicating through remote location 102.

Figure 2:
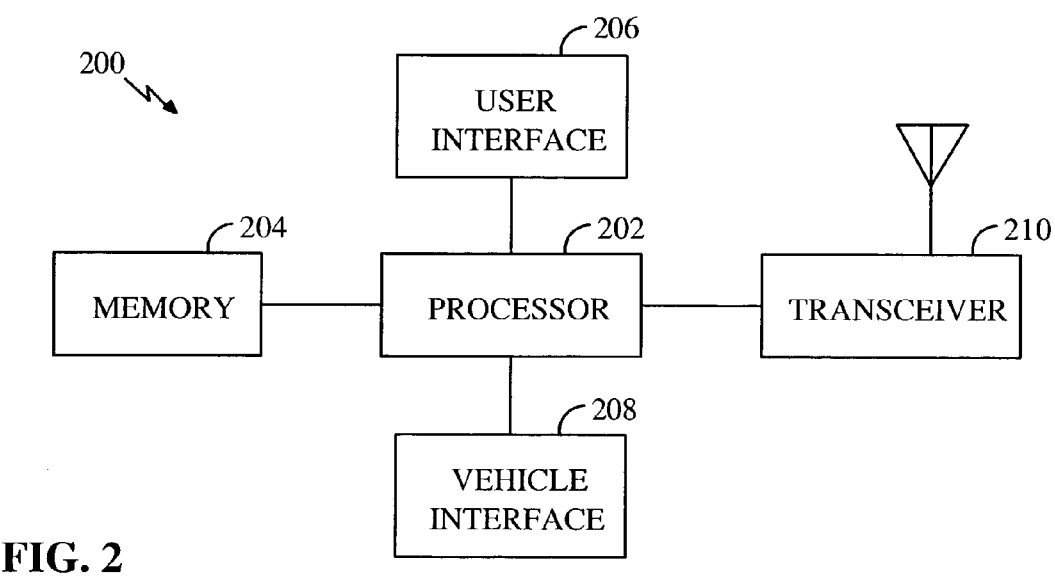
FIG. 2 shows a functional block diagram of one embodiment of a mobile communication terminal for use in the communication system of FIG. 1.

FIG. 2 shows a functional block diagram of one embodiment of a MCT 200 for use in a vehicle, for example, vehicle 100. The MCT 200 generally comprises a processor 202, a memory 204, a vehicle operator (user) interface 206, a vehicle interface 208, and a transceiver 210. It should be understood that the functional blocks shown in FIG. 2 may be housed together in a single structural unit, or they may be distributed in any combination throughout vehicle 100. For example, the transceiver 210 may or may not be incorporated into the physical structure of MCT 200.

Processor 202 generally comprises circuitry necessary for executing machine-readable instructions stored in memory 204. For example, processor 202 may comprise a microprocessor and supporting circuitry, such as the Intel 80×86 or Pentium series of microprocessors. Of course, other electronic processors could be used in the alternative. Memory 204 may comprise one or more signal-bearing mediums tangibly embodying one or more programs of machine-readable instructions executable by a digital processing apparatus, such as processor 202. Typically, memory 204 comprises one or more volatile and/or non-volatile memories, such as a read-only memory (ROM), random-access memory (RAM), electrically erasable programmable read-only memory (EEPROM), a hard drive, a floppy disk drive and floppy disk, or a flash memory. Memory 204 is used to store instructions relating to the operation of MCT 200 including instructions relating to communications with remote location 102. For example, instructions may be stored relating to the detection of certain vehicle operating characteristics, such as the vehicle location, vehicle speed, engine RPM, load status, driver status, etc. Other information stored within memory 204 generally includes instructions for processor 202 to communicate with remote location 102. Further, instructions may be stored for managing and controlling vehicle 100. For instance, instructions may be stored within memory 204 for impairing operation of vehicle 100 in an emergency. Each vehicle that includes an MCT 200 may have a distinct set of instructions stored within memory 204 for controlling the vehicle during pre-defined events.

Vehicle operator interface 206 allows a vehicle operator to enter instructions into the MCT 200, and typically comprises a keyboard or keypad and a visual display device. Of course, vehicle operator interface 206 could alternatively comprise other types of interfaces, such as a microphone for entering audible commands, a pointing device such as a mouse, light pen, trackball, and/or a speaker for generating audible information to a vehicle operator. Other types of well-known devices could be used, either alternatively or in combination, with the devices just mentioned. For example, the vehicle operator interface may, alternatively or in addition, comprise a biometric device or a card reader.

Vehicle interface 208 allows processor 202 to communicate with one or more electronic control units (ECUs) located onboard vehicle 100, either directly, or through one or more intermediary devices, such as an onboard computer (not shown). Vehicle interface 208 comprises a communication port such as a serial data port for communicating, for example, with an onboard computer. Alternatively, vehicle interface 208 comprises a port for interfacing to a vehicle data bus, such as a bus that conforms to standards specified under SAE J1708 and commonly used in vehicles today. Examples of ECUs include a fuel regulator/cutoff switch, an ignition controller, an electronic transmission controller, a steering wheel locking mechanism, and a brake activation unit. Other examples of ECUs include electronic devices that provide operational information about vehicle 100 to processor 202. For example, these types of ECUs comprise a speed sensor, an RPM sensor, an odometer, or a location sensor such as a GPS receiver.

In modern vehicles, the ECUs may be interconnected by a data bus, such as a data bus as specified under SAE J1708, or any other suitable data bus. The data bus is connected to vehicle interface 208 so that communications may take place between the processor 202 and the various ECUs connected to the data bus.

Transceiver 210 comprises circuitry to modulate information from processor 202 and convert the modulated information into high frequency signals suitable for wireless transmission. Similarly, transceiver 210 also comprises circuitry to convert received high frequency communication signals into signals suitable for demodulation and subsequent processing by processor 202.

Figure 3:
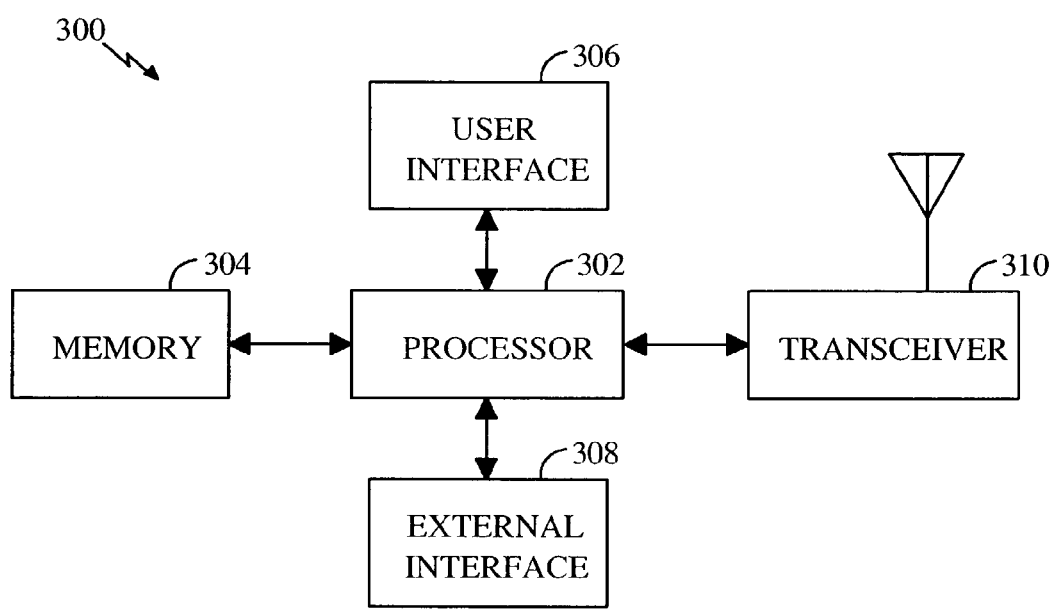
FIG. 3 shows a functional block diagram of one embodiment of a remote host location for use in the communication system of FIG. 1.

FIG. 3 shows a functional block diagram of one embodiment of an apparatus 300 comprising a processor 302, a memory 304, an operator interface 306, a transceiver 310, and an external interface 308. The apparatus 300 is typically used at a remote location, for instance, remote location 102 or remote location 104, to communicate with one or more vehicles, such as vehicle 100. For the purpose of providing clarity to this description, it will be assumed that the apparatus 300 is located at remote location 102.

Processor 302 generally comprises circuitry necessary for executing executable computer instructions stored in memory 304. For example, processor 302 may comprise a microprocessor and supporting circuitry, such as the Intel 80×86 or Pentium series of microprocessors. Of course, other electronic processors could be used in the alternative. Memory 304 may comprise one or more volatile and/or non-volatile memories, such as a read-only memory (ROM), random-access memory (RAM), electrically erasable programmable read-only memory (EEPROM), a hard drive, a floppy disk drive and floppy disk, or a flash memory. Memory 304 is used to store information relating to the operation of central station 102 and, more specifically, information relating to communications with vehicles, such as vehicle 100. For example, one or more databases could be stored within memory 304, each database relating to a fleet of vehicles and containing information pertinent to each vehicle such as license plate number, vehicle identification number, vehicle type, vehicle maintenance schedules, vehicle location, vehicle operational parameters such as speed, RPM, fuel information, oil pressure, load status, etc. Other information stored within memory 304 generally includes executable computer instructions for processor 302 to communicate with one or more vehicles and one or more remote locations 104, 106, etc. Further, instructions may be stored for managing and controlling specific vehicles. For instance, instructions may be stored within memory 304 for impairing operation of vehicle 100 in an emergency. Each vehicle may have a distinct set of instructions stored within memory 304 for controlling that vehicle during pre-defined events.

Operator interface 306 allows a central station operator to enter instructions into processor 302 and typically comprises a keyboard or keypad and a visual display device. Of course, the central station operator interface 306 could alternatively comprise other types of interfaces, such as a microphone for entering audible commands, a pointing device such as a mouse, light pen, trackball, and/or a speaker for generating audible information to a central station operator. Other types of well-known devices could be used, either alternatively or in combination, with the devices just mentioned.

External interface 308 allows processor 302 to communicate with one or more remotely located entities, such as dispatch centers and third party centers (or central station 102 if apparatus 300 is not located at central station 102). External interface 308 comprises one or more devices for allowing various forms of two-way communications to occur between the various central stations. Examples of external interface 308 comprise a telephonic interface, an optical interface, a data interface (for example, a T1, T3, or the like), an Internet interconnection device such as a router, a wireless transceiver, or a combination of these devices, as well as others.

Transceiver 310 comprises circuitry to modulate information from processor 302 and convert the modulated information into high frequency signals suitable for wireless transmission. Similarly, transceiver 310 also comprises circuitry to convert received high frequency communication signals into signals suitable for demodulation and subsequent processing by processor 302.

Figure 4:
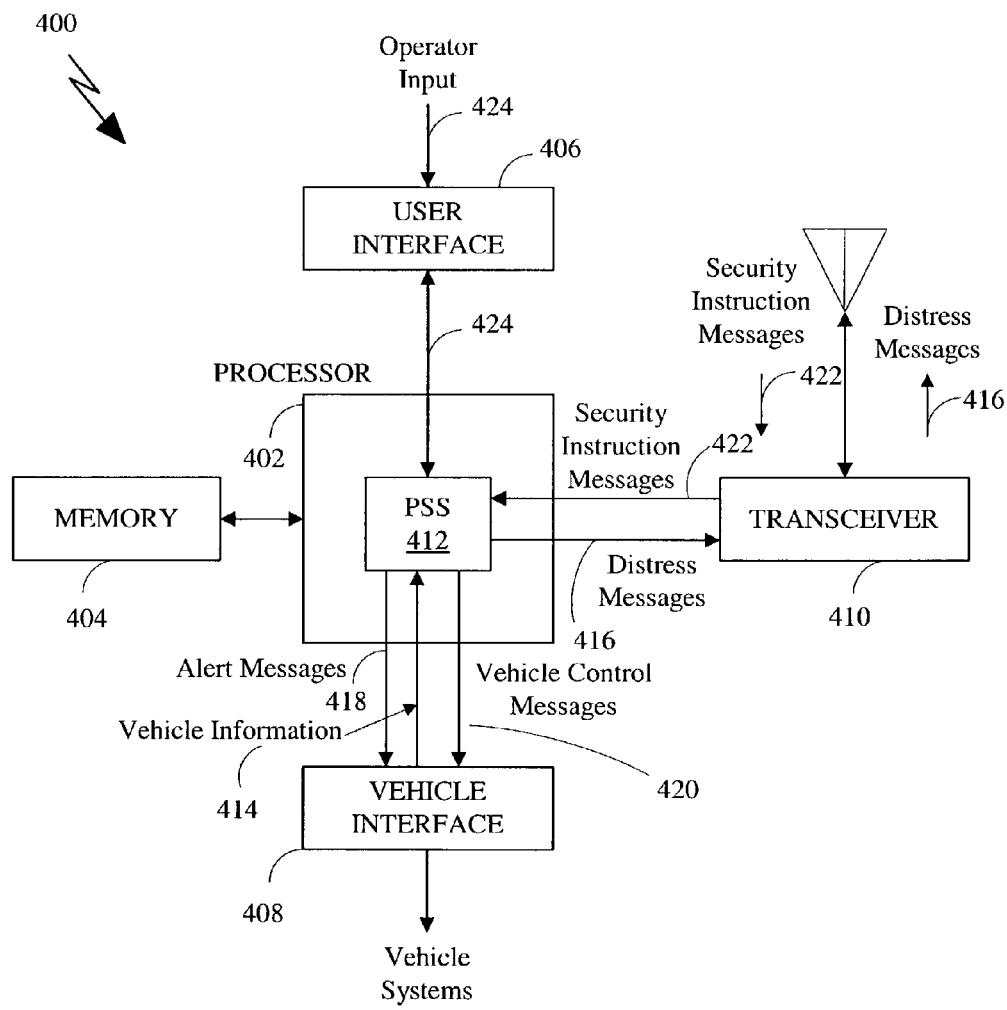
FIG. 4 shows a functional block diagram of one embodiment of a personal security system incorporated into a mobile communication terminal.

FIG. 4 shows a functional block diagram of one embodiment of a PSS 412 incorporated into a MCT 400 for use in a vehicle, such as vehicle 100 shown in FIG. 1. The PSS 412 operates to protect the operator of the vehicle, for example, when the operator must leave the safety of the vehicle to make a delivery at an isolated and/or unattended location. The PSS 412 may also operate to protect the cargo carried by the vehicle from theft or damage. As shown in FIG. 4, the MCT 400 comprises processor 402, memory 404, user interface 406, vehicle interface 408, and transceiver 410.

In one embodiment, the PSS 412 is incorporated into the MCT installed in the vehicle. For example, the PSS 412 may comprise software instructions stored in memory 404 that are executable by processor 402 to provide the PSS functions described herein. The software instructions may be pre-stored into memory 404 or may be downloaded into the memory by the vehicle operator. For example, the vehicle operator may download the instructions into the memory 404 (via the user interface 406) from a floppy disc, CDROM, flash memory, or other type of storage media. In another embodiment, the instructions are downloaded from a central station. For example, in one embodiment, the software instructions are wirelessly transmitted from a central station and received by the transceiver 410. The processor 402 receives the software instructions from the transceiver 410 and stores the instructions into memory 404. Therefore, the instructions are transmitted from a central station in the form of a signal waveform that is received by the MCT 400 for storage at the memory 404 and execution by the processor 402 to provide the functions of the PSS described herein.

In another embodiment, the PSS 412 comprises dedicated hardware and associated software. For example, in one embodiment, hardware logic comprising a processor, CPU, gate array, discreet logic and/or other circuitry is incorporated into the MCT 400, for instance, within the processor 402. Software executing at processor 402 operates to control the hardware logic of the PSS 412 to provide the PSS functions described herein. In one embodiment, the PSS 412 hardware includes its own software that is running in conjunction with other software of the MCT 400, or in a stand-alone mode.

In still another embodiment, the PSS 412 comprises a stand-alone system having its own hardware and/or software that is installed in the vehicle and communicates with the MCT 400 to perform the described PSS functions. For example, a stand-alone PSS may communication with the MCT through a vehicle interface, such as vehicle interface 408.

Therefore, the PSS 412 may be embodied in various configurations either within the MCT 400 or as a stand-alone device. Software utilized in the various configurations may be pre-stored, downloaded by the vehicle operator, or wirelessly downloaded from a central station in the form of a carrier wave.

During operation of the PSS 412, the vehicle operator enters operator input 424 in the form of information or commands into the PSS 412 via the user interface 406. In one embodiment, the user interface 406 comprises a button or switch located on the vehicle dashboard. During operation of the PSS 412, the operator may activate the button or switch to generate an actuation signal to timing logic located within the PSS 412. The timing logic operates to measure a predetermined time period that defines how long the operator expects be away from the vehicle's controls. In another embodiment, information is stored in the PSS 412 and the timing logic is activated when the vehicle operator opens the door of the vehicle. For example, the vehicle interface 408 detects that the vehicle door has been opened and relays this information to the PSS 412. The PSS 412 receives vehicle information 414 indicating that the door has been opened, and sends the actuation signal to the timing logic. It is also possible to use the vehicle interface 408 to provide other vehicle indicators to the PSS 412 that may be used to activate the timing logic, such as the opening of a cargo door, the unloading of cargo or other materials, etc.

Once the timing logic is activated by the actuation signal, the operator leaves the vehicle to conduct an activity, such as to refuel the vehicle or unload cargo carried by the vehicle. If the vehicle operator fails to return to the vehicle to deactivate the PSS 412 before the end of the predetermined time interval, the completion of the predetermined time interval will cause a security timeout to occur. In response to the security timeout, the PSS 412 generates one or more distress messages 416 for transmission to a central station via the transceiver 410. If the operator returns to the vehicle controls and deactivates the PSS 412 before the end of the predetermined time period, no security timeout will occur and therefore no distress messages 416 will be sent. For example, the operator may enter a deactivation command via the user interface 406 to deactivate the PSS 412. Thus, the PSS 412 protects the vehicle operator by informing a central station when the operator is away from the controls of the vehicle for longer than a predetermined amount of time. When the operator does not return, the PSS 412 assumes that a problem has occurred. For example, the operator may not have returned to the vehicle controls because he was attacked by an assailant, became ill, was injured, or otherwise incapacitated. The distress message 416 also helps to protect the vehicle's cargo, since the central station 102 can take steps to protect the cargo, such as notifying local authorities, when it receives the distress message 416.

Typically, the distress message 416 provides vehicle location information and other relevant security information to the central station 102. The PSS 412 may also generate and send one or more pre-programmed alert messages 418 to the vehicle interface 408 to activate/deactivate various vehicle alert systems, such as a vehicle horn, vehicle lights, an alarm system, etc. The alert message(s) 418 is(are) used to provide a local indication that a security timeout has occurred. The PSS 412 may also generate one or more pre-programmed vehicle control messages 420 to control the operation of the vehicle. For example, the PSS 412 may send a vehicle control message 420 to the vehicle interface 408 to control one or more vehicle systems, such as the engine, ignition system, cargo unloading mechanisms, etc.

In one embodiment, when the central station 102 receives a distress message 416, it responds by transmitting one or more security instruction messages 422 to the PSS 412 via the transceiver 410. The security instruction messages 422 may be used by the PSS 412 to generate alert messages 418 or vehicle control messages 420. For example, in response to receiving a distress message 416, the central station may send a security instruction message 422 to the PSS 412 that causes the PSS 412 to generate and send a vehicle control message 420 to the vehicle interface 408 that, for instance, impairs the operation of the vehicle or its cargo unloading mechanisms by controlling one or more vehicle ECUs.

Figure 5:
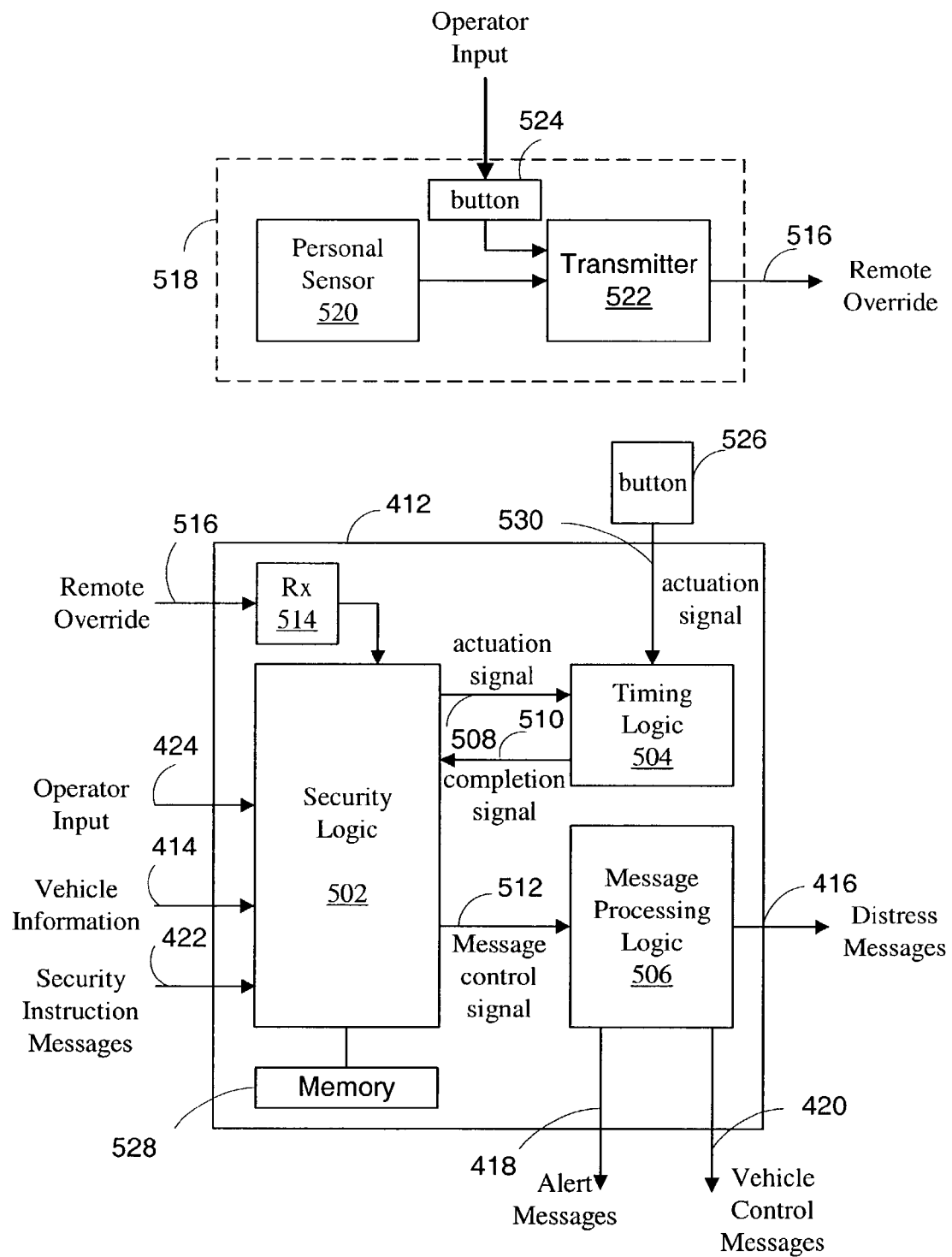
FIG. 5 shows a detailed diagram of one embodiment of a personal security system.

FIG. 5 shows a detailed functional diagram of one embodiment of the PSS 412. The PSS 412 comprises security logic 502, timing logic 504, message processing logic 506, a receiver 514, and memory 528. The security logic 502 may comprise a processor, CPU, gate array, logic, discreet circuitry, software, or any combination of hardware and software. The security logic 502 includes input logic to receive various operator and vehicle-generated signals. For example, the security logic 502 receives the operator inputs 424 from the user interface 406 and the vehicle information 414 from the vehicle interface 408. The security logic 502 also receives the security instruction messages 422 from the transceiver 410.

It should be understood that the elements shown in FIG. 5 are for illustrative purposes only, and that implementation of PSS 412 could be achieved in one of any number of ways, using a greater, or fewer, functional elements. For example, security logic 502, timing logic 504, and message processing logic 506 could all be implemented in a computer program executed by one or more processors. In another embodiment, completion signal 510 could alternatively be routed directly to message processing logic 506.

The timing logic 504 may comprise a processor, CPU, gate array, logic, discreet circuitry, software, or any combination of hardware and software. The timing logic 504 operates to measure predetermined time periods. The security logic 502 is coupled to the timing logic 504 and the timing logic 504 provides a completion signal 510 to the security logic 502 to indicate that a predetermined time period has expired.

An actuation signal 508 is provided to the timing logic 504 from the security logic 502 to activate the timing logic 504 to begin measuring the predetermined time period. For example, the security logic 502 may generate the actuation signal 508 in response to receiving a particular operator input 424, or in response to receiving selected vehicle information 414. For instance, the security logic 502 may generate the actuation signal 508 in response to receiving vehicle information 414 that indicates that a vehicle door has been opened.

In another embodiment, a dedicated apparatus 526 generates an actuation signal 530, which is input directly to the timing logic 504. For example, the dedicated apparatus 526 may comprise a button or switch located on the dashboard of the vehicle, and the actuation signal 530 is generated when the operator actuates the button or switch. Thus, either actuation signal 508 or 530 may to used to activate the timing logic 504.

In one embodiment, the actuation signal (508 or 530) activates the timing logic 504 to measure a predetermined time period, for instance, a thirty-minute time period. At the end of the thirty-minute time period, the timing logic 504 transmits the completion signal 510 to the security logic 502 to indicate the expiration of the predetermined time period. Thus, the timing logic 504 operates to measure (or time) virtually any time period.

In another embodiment, the actuation signal 508 generated by the security logic 502 includes control information to control the operation of the timing logic 504. For example, the control information can be used to clear, preset, reset, suspend, or otherwise control the operation of the timing logic 504. Alternatively, or in addition, actuation signal 508 comprises information indicating the length of time that timing logic 504 will measure. For example, a vehicle operator may be able to specify the time period that he/she expects to be unloading cargo using interface 406.

The message processing logic 506 may comprise a processor, CPU, gate array, hardware logic and/or discreet circuitry, software, and/or any combination of hardware and software. The message processing logic 506 is coupled to the security logic 502 to receive a message control signal 512. The message processing logic 506 operates to generate messages used during operation of the PSS 412. In one embodiment, the messages are stored directly in the message processing logic 506. In another embodiment, the messages are stored in memory 528 and are sent to the message processing logic 506 via the message control signal 512. In another embodiment, the memory 528 is coupled directly to message processing logic 506 and messages are accessed as needed. In another embodiment, the message processing logic 506 assembles specific messages from real-time information sent in the message control signal 512, such as the current time. Thus, the message processing logic 506 may use virtually any combination of stored and real-time information to generate the various messages.

During operation of the PSS 412, the security logic 502 may generate a message control signal 512 in response to receiving a completion signal 510. The message control signal 512 causes the message processing logic 506 to generate one or more distress messages 416 to be transmitted to the central station. Alternatively, or in addition, the message processing logic 506 may generate one or more alert messages 418 that are used by the vehicle interface 408 to control vehicle alert systems, such as controlling the vehicle headlights or horn. In another embodiment, the message processing logic 506 generates one or more vehicle control messages 420 that are used to control vehicle systems, such as the engine, ignition or cargo unloading systems. In one embodiment, vehicle control messages 420 are generated in response to the security logic 502 receiving a security instruction message 422. For example, the security logic 502 uses the security instruction message 422 to generate a selected message control signal 512 that causes the message processing logic 506 to generate the selected vehicle control messages 420.

The PSS 412 may further comprise a receiver 514 to receive a remote override signal 516 generated by an optional personal security accessory 518. The override signal 516 is designed to allow a vehicle operator to override the timing logic 504 so that a distress message(s) 416, alert message(s) 418, and/or vehicle control message(s) 420 can be sent upon receipt of the signal 516, rather than waiting for the completion signal 510 to be generated. The accessory 518 comprises a personal sensor 520 and/or switch 524, and a transmitter 522 that generate and send the remote override signal 516 to the receiver 514. The accessory 518 is designed to be small and lightweight so that it may be worn on the person of the vehicle operator.

In one embodiment, the accessory 518 comprises a pushbutton switch 524, or similar mechanism, to generate a signal when the operator actuates the switch 524. For example, the operator may actuate the switch 524 anytime he is injured, threatened, becomes ill, or determines that a distress message 416 should be transmitted, or that an alert message 418 and/or a control message 420 should be generated. Upon actuation of the switch, the accessory 518 generates and transmits the remote override signal 516.

Alternatively, or in addition, to switch 524, the accessory 518 comprises a personal sensor 520 which generally operates to detect whether or not the operator is in an upright position. For example, if the vehicle operator is attacked by an assailant and knocked to the ground, the sensor 520 will detect that the operator is no longer in an upright position and this condition will cause the override signal 516 to be transmitted. Additionally, if the operate falls to the ground because of sudden illness or injury, the sensor 520 will detect this situation as well. In one embodiment, the sensor 520 comprises a mercury switch to detect the operator's position, however, any type of position or orientation sensor may be used that is suitably small and lightweight. In addition, the sensor 520 may include noise reduction logic to minimize or eliminate false detections. For example, if the sensor 520 output is in an active state when the operator not in the upright position, the noise reduction logic may require that the sensor 520 output remain in the active state for a selected time period (i.e., five seconds) before causing the override signal 516 to be transmitted.

When the personal sensor 520 detects that the operator is no longer in an upright position, the sensor 520 generates a signal to the transmitter 522 that causes the transmitter 522 to transmit the override signal 516 to the receiver 514. In one embodiment, the transmitter 522 includes logic to transmit the remote override signal as a radio frequency (RF) signal, such as an amplitude modulated signal or a frequency modulated signal. In other embodiments, the transmitter 522 comprises logic to transmit the remote override signal using virtually any format and any transmission technology including but not limited to, electrical, optical, audible, or any other suitable transmission technology. The receiver 514 comprises any suitable receiving logic that is compatible with the transmitting logic used by the transmitter 522. Thus, the receiver 514 comprises any required receiving logic to receive the override signal 516.

It should be understood that in one or more embodiments, the accessory 518 comprises any combination of a sensor 520 and operator-activated pushbutton switch 524 that are used to determine whether or not the override signal 516 should be transmitted.

When the receiver 514 receives the remote override signal 516, the receiver 514 feeds the override signal 516 to the security logic 502. In one or more embodiments, the security logic 502 is configured to respond to the override signal 516 by causing any combination of distress messages 416, alert messages 418, and vehicle control messages 420 to be generated.

In one embodiment, when the security logic 502 receives the remote override signal 516, the security logic generates control information that is provided to timing logic 504 to suspend further activity, i.e., the continued measurement of the predetermined time period. Thus, completion signal 510 is not generated. In this embodiment, security logic 502 sends message control signal 512 to message processing logic 506 as a result of receiving the remote override signal 516, rather than as a result of the predetermined time period expiring, as measured by timing logic 504.

In another embodiment, when the security logic 502 receives the remote override signal 516, the security logic 502 sends a message control signal 512 to the message processing logic 506 to generate a distress message 416 (or other messages 418 and/or 420)indicating that an override signal was received. In the meantime, the timing logic 504 is allowed to continue with its timing functions. Assuming the vehicle operator has been injured and is unable to deactivate the PSS 412, a completion signal 510 will be generated in response to the expiration of the selected time period. In response, the security logic 502 sends another message control signal 512 to the message processing logic 506 to generate a distress message indicating a security timeout has occurred. Thus, a first distress message 416 is sent in response the override signal 516, and a second distress message 416 is sent in response to the completion signal 510. Because the types and formats of the distress messages 416 are selectable, security personnel at the central station 102 may obtain a sequence of distress messages 416 that may be used to provide a wide range of information about the status of the operator and/or the vehicle.

In yet another embodiment, when the security logic 502 receives the remote override signal 516, the security logic 502 sends a command to timing logic 504 which forces the timing logic 504 to immediately send completion signal 510, thereby allowing one or more distress messages 416, or other messages 418 and/or 420, to be generated.

Figure 6:
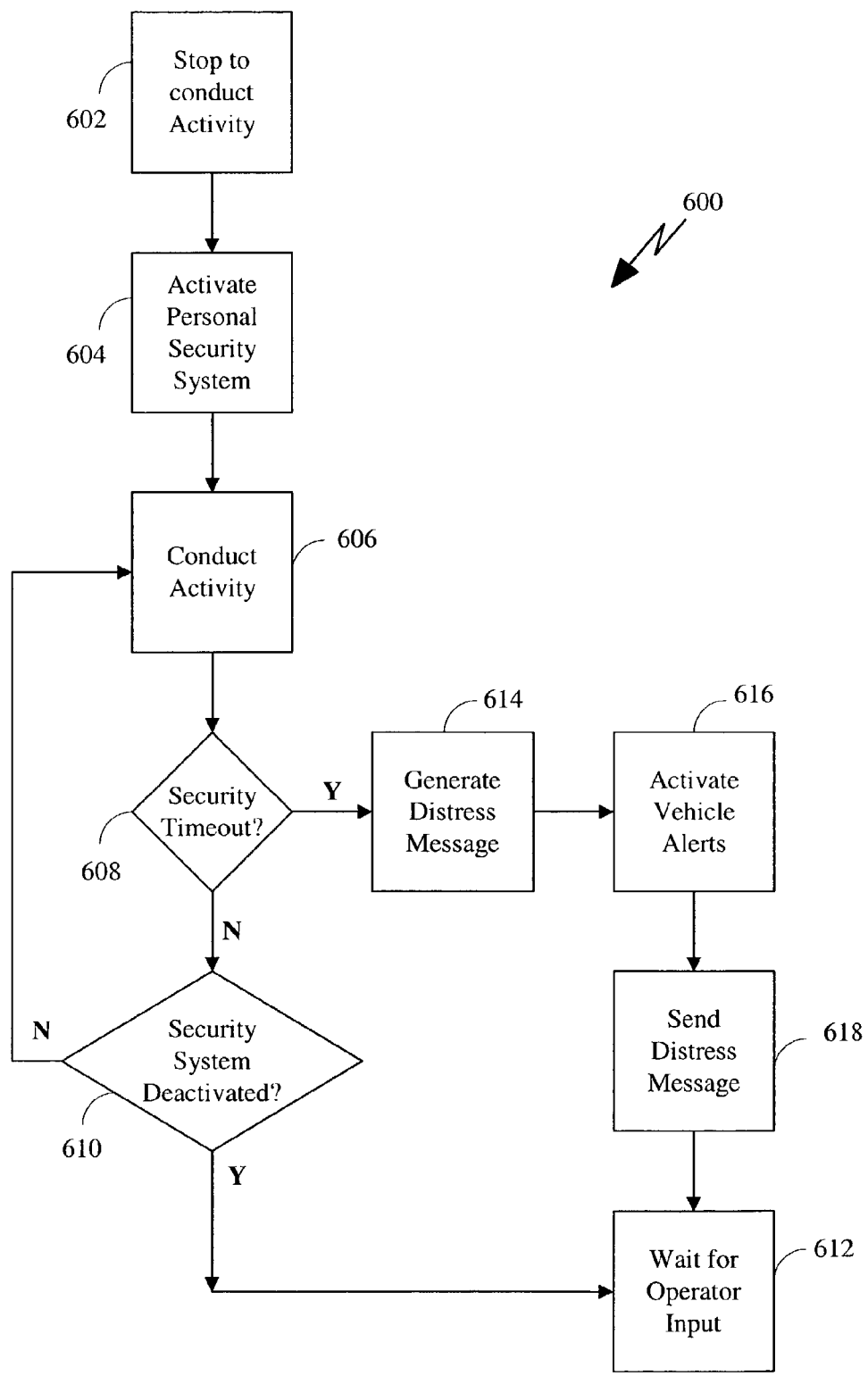
FIG. 6 shows one embodiment of a method for operating the personal security system of FIG. 5.

FIG. 6 shows one embodiment of a method 600 for operating the PSS 412 described above. For the following description, it will be assumed that the PSS 412 is installed in a delivery vehicle that is carrying a load to be delivered to a remote and unattended location. For example, the delivery vehicle may be a fuel truck carrying a load of fuel to be delivered to a remote and unattended fuel storage station. Furthermore, it is assumed that the vehicle includes communication logic to communicate with a central station 102 using a wireless communication channel.

At block 602, the vehicle arrives at the fuel station and the operator stops to conduct the activity of unloading the fuel. To do this, the operator must exit the vehicle to establish fuel line or electrical connections and operate the refueling equipment at the fuel station.

At block 604, the operator activates the PSS 412 before exiting the vehicle to begin the fuel delivery. For example, in one embodiment, the operator presses a button located on the vehicle's dashboard to activate the PSS 412. The operator may, alternatively or in addition, enter various information and/or codes into the PSS (via user interface 406) to indicate, for example, the reason the operator is leaving the vehicle, the amount of time the operator expects to be away from the vehicle's controls, and instructions as to what action should be taken if the operator does not return after a predetermined time period. In another embodiment, the above information is pre-stored in the PSS 412 and the PSS 412 is activated when the operator opens the door to exit the vehicle. In this embodiment, a signal indicating that the vehicle door has been opened is relayed to the PSS 412 (via vehicle interface 408) in order to activate PSS 412 functions.

When the operator activates the PSS 412, the timing logic 504 begin measuring a predetermined time period that is associated with the amount of time the operator expects to be away from the vehicle's controls while making the delivery. The predetermined time period comprises a fixed time period stored in memory 528, or a time period that may be altered by the vehicle operator either at the time the vehicle operator exits the vehicle or at any time prior to the operator's departure from the vehicle.

At block 606, the operator exits the vehicle and begins unloading the fuel cargo. The unloading activity takes a certain amount of time to accomplish, and the approximate time is generally known since the unloading process is routinely performed.

At block 608, a test is performed to determine if the predetermined time period has passed (security timeout), which will result in the generation of the completion signal 510. For example, the security logic 502 determines whether or not the completion signal 510 has been received from the timing logic 504. If the predetermined time period is complete, the method proceeds to block 614. If the predetermined time period is not complete, the method proceeds to block 610.

At block 610, a test is performed to determine if the operator has deactivated the PSS 412. For example, after the operator completes the cargo delivery, the operator returns to the vehicle controls and deactivates the PSS 412, for instance, by entering commands via the user interface 406. If the test at block 610 determines that the operator has deactivated the PSS 412, the method proceeds to block 612. If the operator has not deactivated the PSS 412, it is assumed that the operator is still conducting the delivery activity, and so the method proceeds to block 606.

Block 614 is reached when it is determined that a security timeout has occurred at block 608. Because a timeout has occurred, it is assumed that the operator has failed to return to the vehicle's controls because of an emergency situation. For example, the operator may have not returned to the vehicle's controls because the operator was criminally attacked or injured during the delivery process. At block 614, the PSS 412 generates one or more distress messages 416, alert messages 418, and/or vehicle control messages 420. For example, in one embodiment, security logic 502 commands the message processing logic 506 to generates the messages. For example, the message processing logic 506 may retrieve pre-stored messages and/or alerts from memory 528. In another embodiment, the messages are stored in memory 404 and retrieved by the message processing logic 506 for transmission. The messages may be generated based on the information entered by the operator when the PSS 412 was activated. For example, in another embodiment, there may be high and low priority messages that are generated based on the information entered by the operator.

At block 616, the alert messages 418 and/or control messages 420 are sent to the vehicle interface 408 to activate or deactivate selected vehicle systems in order to signal an alert condition or protect the vehicle's cargo. For example, the alert messages 418 may cause the vehicle interface 408 to activate the vehicle's ECUs to control the headlights or horn.

At block 618, one or more distress messages 416 are transmitted to central station 102 via the transceiver 410. The distress message 416 may be transmitted to central station 102 or to any other designated receiving station. For example, a distress message 416 may be transmitted via a satellite communication channel to the central station 102, which may be located virtually anywhere in the country. In another embodiment, a distress message 416 is transmitted to a local receiving office via a terrestrial communication channel, such as a cellular communication channel or other type of radio frequency communication channel.

At block 612, the PSS 412 has completed sending the alert 418, control 420, and/or distress 416 messages and enters a waiting state while waiting for further input from the operator. For example, the operator may have been simply delayed in returning to the vehicle, and upon his return, enters additional information into the PSS 412 to indicate that the security timeout was not the result of an emergency situation. In another embodiment, the PSS 412 waits to receive additional information or instructions from the central station 102 that received the distress message 416. For example, the receiving station may transmit security instruction messages 422 to the PSS 412 that cause the PSS 412 to generate one or more vehicle control messages 420 to disable or impair the operation of the vehicle.

Figure 7:
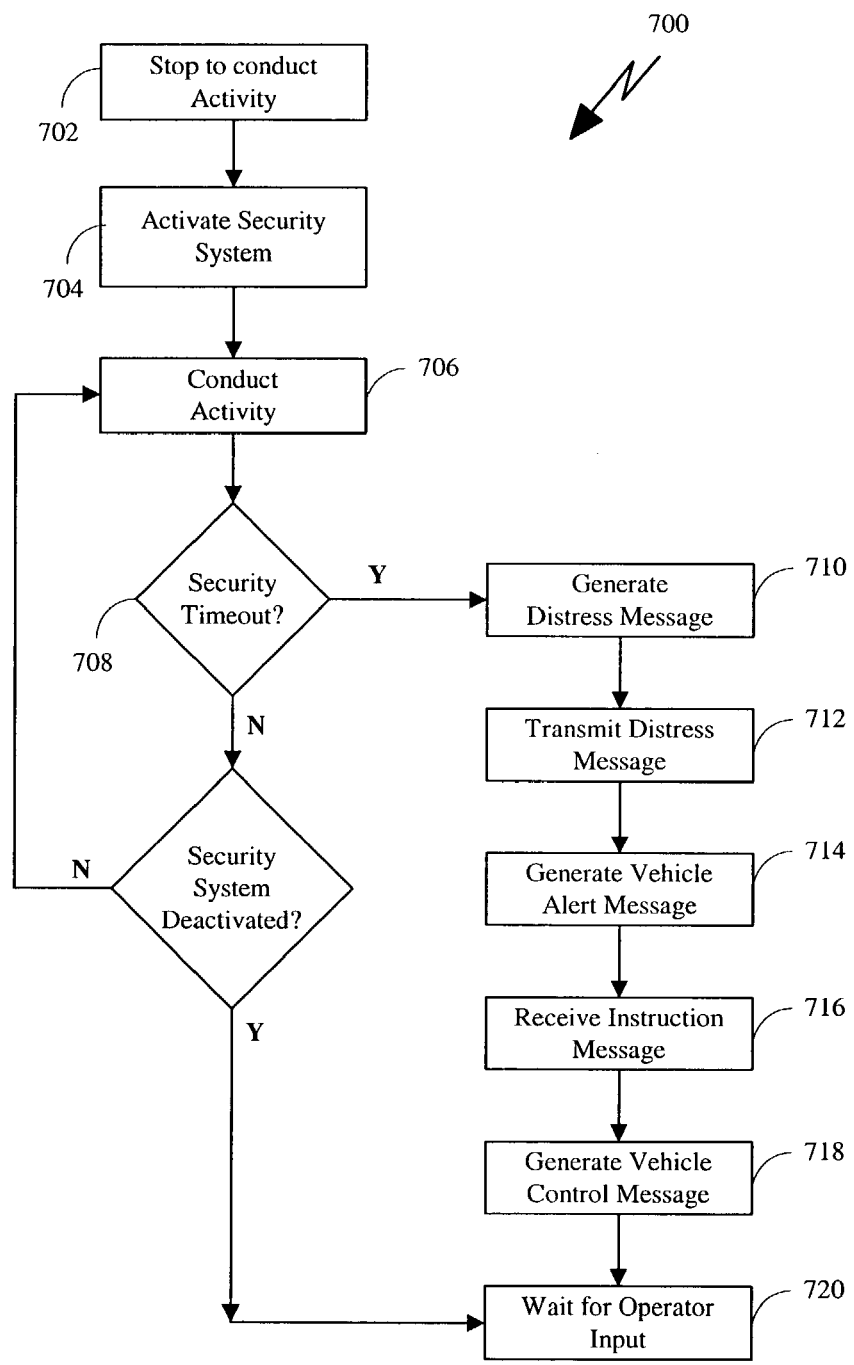
FIG. 7 shows one embodiment of another method for operating the personal security system of FIG. 5.

FIG. 7 shows one embodiment of another method 700 for operating the PSS 412 described above. The method 700 is directed to receiving and processing instructions sent from a central station in response to a transmitted distress message. Many of the functional blocks (702, 704, 706, and 708) of method 700 are similar to those of method 600, and so those blocks will not be discussed in detail in this section of the document.

At block 710, a distress message 416 is generated after it is determined that a security timeout has occurred at block 708. At block 712, the distress message 416 is transmitted to the central station via the transceiver 410, as described above.

At block 714, an alert message 418 may be generated to activate one or more vehicle alert systems, for example, the vehicle's lights or horn.

At block 716, the PSS 412 receives a security instruction message 422 from the central station in response to the transmitted distress message. The instruction message 422 instructs the PSS 412 to activate one or more vehicle control mechanisms.

At block 718, the PSS 412 generates a vehicle control message 420 that is sent to the vehicle interface 408 to activate or deactivate one or more vehicle control mechanisms by controlling the vehicle's ECUs. For example, the vehicle control message may disable the vehicle's ignition to prevent the vehicle from being moved from its current location, or disable the vehicle's cargo unloading mechanisms to prevent the cargo from being removed from the vehicle.

At block 720, the PSS 412 waits for further input from the operator or additional security instruction messages 422 from the central station.

Figure 8:
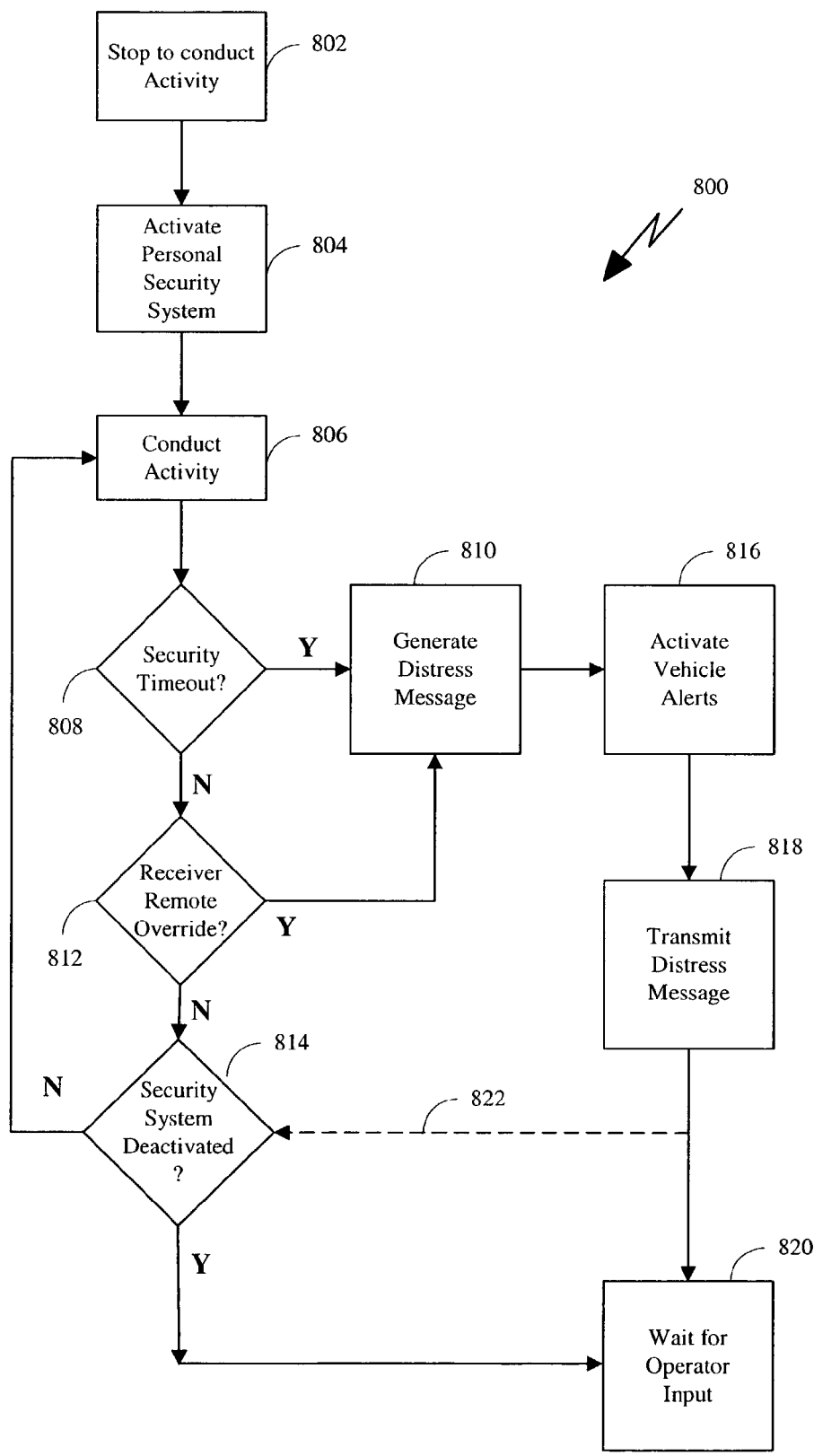
FIG. 8 shows one embodiment of another method for operating the personal security system of FIG. 5.

FIG. 8 shows one embodiment of another method 800 for operating a PSS 412 that illustrates how the PSS 412 operates to receive and process a remote override signal 516. When the remote override signal 516 is received, a distress message 416 is transmitted without having to wait for a security timeout to occur.

At block 802, a vehicle operator stops a delivery vehicle to conduct an activity, such as making a cargo delivery. At block 804, before exiting the vehicle, the operator activates the PSS 412 by entering operator inputs using the user interface 406. In another embodiment, the PSS 412 is automatically activated when the operator opens the vehicle door to exit the vehicle. The operator exits the vehicle wearing the personal security accessory 518. At block 806, the operator begins conducting the delivery activities.

At block 808, a test is performed by the PSS 412 to determine if a security timeout has occurred. If a timeout has occurred, the method proceeds to block 810 where a distress message 416 is generated. If a timeout has not occurred, the method proceeds to block 812.

At block 812, a test is performed to determine if a remote override signal 516 has been received. For example, if the operator is injured and falls to the ground while conducting delivery activities, the security accessory 518 worn by the operator detects that the operator is no longer in the upright position and transmits the remote override signal 516 to the PSS 412. In another embodiment, the operator may cause the remote override signal 516 to be transmitted by pressing a button 524 on the security accessory 518. If a remote override signal 516 has been received, the method proceeds to block 810 where a distress message 416 is generated. If a remote override signal 516 has not been received, the method continues to block 814.

At block 810, a distress message 416 is generated in response to either a security timeout or the receipt of the remote override signal 516. At block 816, a vehicle alert message 418 may be generated. At block 818, the distress message 416 is transmitted to a central station to report that either a security timeout has occurred or that the override signal 516 has been received. In one embodiment, after the distress message 416 is transmitted in response to the override signal 516, the method proceeds to block 820 to wait for additional operator input. In another embodiment, after the distress message 416 is transmitted in response to the override signal 516, the method proceeds to block 814, as show at 822, to continue waiting for a security timeout. Therefore, it is possible that two distress messages 416 are generated and transmitted to the central station. For example, a first distress message 416 is transmitted in response to an override signal 516 and a second distress message 416 is transmitted in response to a security timeout condition that occurred because the operator was unable to return to the vehicle's controls to deactivate the PSS 412.

At block 814, a test is performed to determine if the PSS 412 has been deactivated. For example, the PSS 412 may be deactivated when the operator completes the delivery activity and returns to the vehicle's controls to input a deactivation code via the user interface 406. If the PSS 412 has been deactivated, the method proceeds to block 820 to wait for additional operator input. If the PSS 412 has not been deactivated, the method proceeds to block 806 to allow another timeout test to be performed.

The methods 600, 700 and 800 are intended to be illustrative and not limiting of the operation of the various embodiments described herein. For example, it would be obvious to one with skill in the art to make minor changes, additions or deletions to any of the described methods. Furthermore, the described method steps may be combined, rearranged or reordered without deviating from the scope of the described embodiments.

Figure 9:
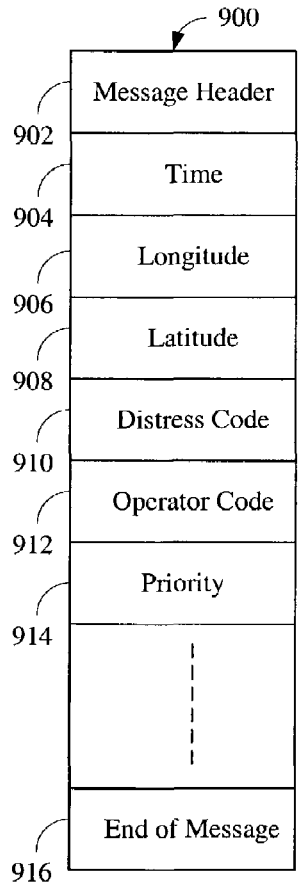
FIG. 9 shows one embodiment of a distress message structure for use with one or more embodiments of a personal security system.

FIG. 9 shows one embodiment of a distress message structure 900 for use with one or more embodiments of the PSS 412. The PSS 412 transmits a distress message to a central station via a transceiver (for example, transceiver 410) in response to a security timeout or override signal 516. It should be noted that the distress message structure 900 is illustrative and not intended to limit the structure of the distress message to that shown in FIG. 9. Therefore, any suitable distress message structure may be used with the PSS 412.

The distress message structure 900 comprises a message header 902, time entry 904, longitude entry 906, latitude entry 908, distress code 910, operator code 912, priority indicator 914, and an end of message indicator 916. The structure 900 may be longer or shorter than that shown and may include multiple distress code entries to identify multiple emergency conditions. The distress code 910 may be used to indicate a specific activity being performed by the operator when a security timeout occurred or to indicate that a remote override signal 516 was received. The latitude 908 and longitude 906 entries are used to indicate the current position of the vehicle at the time the distress message is sent.

Figure 10:
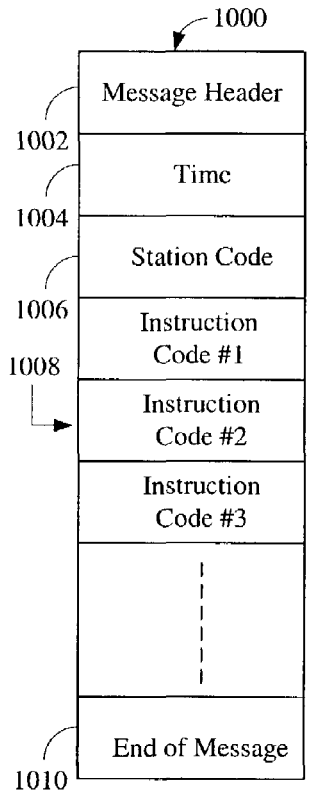
FIG. 10 shows one embodiment of an instruction message structure for use with one or more embodiments of a personal security system.

FIG. 10 shows one embodiment of a security instruction message structure 1000 for use with one or more embodiments of the PSS 412. The security instruction message structure 1000 comprises a message header 1002, time indicator 1004, station code 1006, one or more instruction codes 1008, and an end of message indicator 1010. It should be noted that the security instruction message structure 1000 is illustrative and not intended to limit the structure of the security instruction message to that shown in FIG. 10. Therefore, any suitable security instruction message structure may be used with the PSS 412.

The security instruction message is transmitted from the central station to the PSS 412 in response to a distress message. The station code 1006 indicates which central station transmitted the instruction message. The instruction codes 1008 direct the PSS 412 to take selected actions. For example, one instruction code may command the PSS 412 to disable the vehicle's engine, while another instruction code may command the PSS 412 to disable the vehicle's cargo delivery system, sound an alarm, or activate the horn or vehicle lights.

Figure 11:
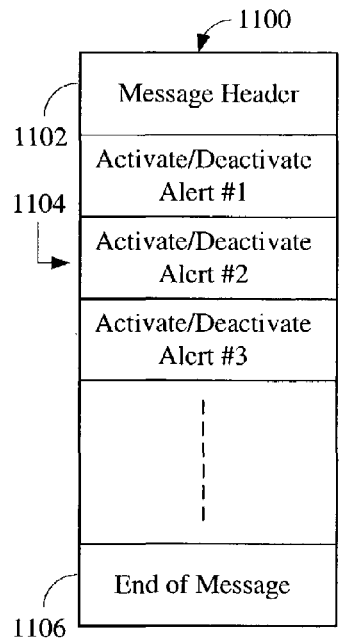
FIG. 11 shows one embodiment of an alert message structure for use with one or more embodiments of a personal security system.

FIG. 11 shows one embodiment of an alert message structure 1100 for use with one or more embodiments of the PSS 412. The alert message structure 1100 comprises a message header 1102, one or more activate/deactivate alert codes 1104, and an end of message indicator 1106. It should be noted that the alert message structure 1100 is illustrative and not intended to limit the structure of the alert message to that shown in FIG. 11. Therefore, any suitable alert message structure may be used with the PSS 412.

In one embodiment, the alert message is transmitted from the PSS 412 to the vehicle interface in response to a security timeout. The activate/deactivate alert codes 1004 direct the vehicle interface to activate or deactivate one or more vehicle systems by controlling vehicle ECUs. For example, one activate/deactivate alert code may activate the vehicle's lights, while another activate/deactivate alert code may deactivate the vehicle's lights.

Figure 12:
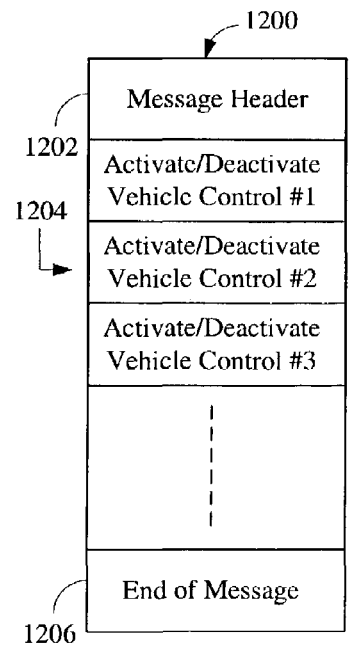
FIG. 12 shows one embodiment of a vehicle control message structure for use with one or more embodiments of a personal security system.

FIG. 12 shows one embodiment of a vehicle control message structure 1200 for use with one or more embodiments of the PSS 412. The vehicle control message structure 1200 comprises a message header 1202, one or more activate/deactivate vehicle codes 1204, and an end of message indicator 1206. It should be noted that the vehicle control message structure 1200 is illustrative and not intended to limit the structure of the vehicle control message to that shown in FIG. 12. Therefore, any suitable vehicle control message structure may be used with the PSS 412.

The vehicle control message is transmitted from the PSS 412 to the vehicle interface 408 to control one or more vehicle systems in response to a security instruction message 422. The activate/deactivate vehicle control entries 1204 direct the vehicle interface 408 to activate or deactivate one or more vehicle systems. For example, in one embodiment, the interface 408 uses the activate/deactivate codes to control one or more vehicle ECUs to deactivate the vehicle's engine, ignition, or cargo unloading mechanisms, while another activate/deactivate code may be used to activate these systems.

A personal security system has been described that protects the operator and/or cargo of a delivery vehicle. The security system is suitable for use with all types of delivery vehicles and is especially well suited to protect vehicle operators while making deliveries at remote and/or unattended locations. In one or more other embodiments, the personal security system can be used to protect an individual without a vehicle, such as in a situation where an individual enters a potentially dangerous environment to make a repair.

Accordingly, while one or more embodiments of a personal security system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The invention claimed is:

1. A personal security system for use by an operator of a vehicle, the personal security system comprising:
   an actuation signal generator;
   timing logic to receive an actuation signal from the actuation signal generator, the timing logic to indicate a security timeout if the timing logic determines an expiration of a time period specified as an amount of time the operator of the vehicle is expected to be away from the vehicle and if the operator fails to deactivate the timing logic prior to the expiration of the time period;
   message logic coupled to the timing logic, the message logic to generate a message at least in part in response to the indication of the security timeout; and
   communication logic to wirelessly transmit the message to a central station, remote from the vehicle, and to receive a security instruction at least in part in response to transmitting the message, the security instruction allowing control of operation of the vehicle from the central station.

2. The personal security system of claim 1, wherein the message comprises a distress message.

3. The personal security system of claim 2, the actuation signal to be generated by the actuation signal generator at least in part in response to one or more of an opening of a vehicle operator door, an opening of a vehicle cargo door, a pressing of a vehicle button1, and/or a detection of the vehicle operator being in an non-upright position.

4. The personal security system of claim 3, wherein said allowing control of the operation of the vehicle comprises allowing a disabling of the vehicle.

5. The personal security system of claim 1, further comprising security logic coupled to the timing logic, the security logic comprising logic to generate the actuation signal in response to an input by the operator.

6. The personal security system of claim 5, further comprising:
   a portable personal security accessory to transmit an override signal; and
   a receiver to receive the override signal and to generate the message at least in part in response to a receipt of the override signal.

7. The personal security system of claim 5, wherein the security logic comprises logic to receive a vehicle information indicator and logic to generate the actuation signal in response to the vehicle information indicator.

8. The personal security system of claim 1, further comprising a switch to generate the actuation signal in response to an input by the operator.

9. The personal security system of claim 1, further adapted to generate a vehicle control message at least in part in response to the indication of the security timeout, the vehicle control message to be used to control one or more vehicle systems.

10. A method for providing a personal security system for use by an operator of a vehicle, the method comprising:
    activating timing logic at least in part in response to an actuation signal;
    indicating a security timeout at least in part in response to an expiration of a time period specified as an amount of time the operator is expected to be away from the vehicle and at least in part in response to the operator failing to deactivate the timing logic;

generating a message at least in part in response to the security timeout;

transmitting the message to a central station, remote from the vehicle; and receiving a security instruction transmitted from the central station at least in part in response to the message transmitted to the central station, the security instruction to allow control of the operation of the vehicle from said central station.

11. The method of claim 10 wherein the message comprises a distress message.

12. The method of claim 11, wherein said activating the timing logic comprises receiving an actuation signal generated in response to an input by the operator.

13. The method of claim 12, wherein said activating the timing logic comprises receiving the actuation signal generated in response to a vehicle information indicator.

14. The method of claim 11, wherein said receiving the security instruction comprises receiving a security instruction message transmitted from the central station in response to the distress message.

15. The method of claim 14, further comprising generating a vehicle control message in response to the security instruction message.

16. The method of claim 11, further comprising receiving an override signal generated from a personal security accessory worn by the operator, and further comprising generating the message at least in part in response to a receipt of the override signal.

17. The method of claim 10, wherein the actuation signal is generated at least in part in response to one or more of an opening of a vehicle operator door, an opening of a vehicle cargo door, a pressing of a vehicle button, and/or a detection of the vehicle operator being in a non-upright position.

18. A personal security system for use by an operator of a vehicle, the personal security system comprising:
means for activating timing logic at least in part in response to an actuation signal;
means for indicating a security timeout at least in part in response to an expiration of a time period specified as an amount of time the operator is expected to be away from the vehicle and at least in part in response to the operator failing to deactivate the timing logic;
means for generating a message in at least in part response to the security timeout;
means for transmitting the message to a central station, remote from the vehicle; and
means for receiving instructions to control one or more vehicle systems from the central station at least in part in response to the central station receiving the message.

19. A personal security system for use by an operator of a vehicle, comprising:
an input device for entering an activation signal indicating the start of an activity;
a timer to indicate a security timeout at least in part in response to an expiration of a time period specified as an amount of time the operator is expected to be away from the vehicle and at least in part in response to the operator failing to deactivate the timing logic;
a processor to generate a message at least in part in response to the security timeout;
a transmitter to transmit the message to a central station remote from the vehicle; and a receiver to receive a response to the message from the central station, the response comprising instructions for controlling a vehicle function.

20. The apparatus of claim 19, wherein the message comprises a distress message.

21. The apparatus of claim 20, further comprising an actuation signal generator to generate the actuation signal at least in part in response to one or more of an opening of a vehicle operator door, an opening of a vehicle cargo door, a pressing of a vehicle button, and/or a detection of the vehicle operator being in a non-upright position.

22. The apparatus of claim 19, further comprising a vehicle interface, wherein said message comprises a vehicle control message to be sent to the vehicle interface, the vehicle control message for controlling a vehicle function.

23. A storage media comprising program instructions which are computer-executable to implement a personal system security system provided for use by an operator of a vehicle, the storage media comprising:
program instructions that cause timing logic to be activated at least in part in response to an actuation signal;
program instructions that cause a security timeout to be indicated at least in part in response to an expiration of a time period specified as an amount of time the operator is expected to be away from the vehicle and at least in part in response to the operator failing to deactivate the timing logic;
program instructions that cause a message to be generated at least in part in response to the security timeout;
program instructions that cause the message to be transmitted to a central station, remote from the vehicle; and
program instructions that cause a security instruction transmitted from the central station to be received at least in part in response to the message transmitted to the central station, the security instruction to allow control of the operation of the vehicle from said central station.

24. The storage media of claim 23 wherein the message comprises a distress message.

25. The storage media of claim 24, further comprising program instructions that cause an actuation signal generated in response to an input by the operator to be received.

26. The storage media of claim 23, further comprising program instructions that cause the actuation signal to be generated at least in part in response to one or more of an opening of a vehicle operator door, an opening of a vehicle cargo door, a pressing a vehicle button, and/or a detection of the vehicle operator being in a non-upright position.

27. The storage media of claim 24, further comprising program instructions that cause a security instruction message transmitted from the central station to be received in response to the distress message.

28. The storage media of claim 27, further comprising program instructions that cause a vehicle control message to be generated in response to the security instruction message.

29. The storage media of claim 24, further comprising program instructions that cause an override signal generated from a personal security accessory worn by the operator to be received, and further comprising program instructions that cause the message to be generated at least in part in response to a receipt of the override signal.

30. The storage media of claim 25, further comprising program instructions that cause the actuation signal generated in response to a vehicle information indicator to be received.

* * * * *